(12) United States Patent
Hirano et al.

(10) Patent No.: US 7,634,906 B2
(45) Date of Patent: Dec. 22, 2009

(54) EXHAUST GAS AFTER-TREATMENT APPARATUS

(75) Inventors: Takashi Hirano, Tokyo (JP); Yasuhiro Sato, Tokyo (JP); Kazuhiro Nomoto, Tokyo (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 11/569,863

(22) PCT Filed: Jun. 6, 2005

(86) PCT No.: PCT/JP2005/010727

§ 371 (c)(1), (2), (4) Date: Aug. 8, 2008

(87) PCT Pub. No.: WO2005/121518

PCT Pub. Date: Dec. 22, 2005

(65) Prior Publication Data

US 2008/0307777 A1 Dec. 18, 2008

(30) Foreign Application Priority Data

Jun. 8, 2004 (JP) ............... 2004-169645

(51) Int. Cl.
*F01N 3/025* (2006.01)
(52) U.S. Cl. ............... 60/285; 60/286; 60/297
(58) Field of Classification Search ........ 60/285, 60/286, 295, 297, 303
See application file for complete search history.

(56) References Cited

U.S. PATENT DOCUMENTS 6,253,545 B1 * 7/2001 Suzuki ............ 60/278

2005/0086933 A1 * 4/2005 Nieuwstadt et al. ......... 60/297

FOREIGN PATENT DOCUMENTS

| JP | 04-047115 | 2/1992 |
| JP | 2000-345883 | 12/2000 |
| JP | 2002-227672 | 8/2002 |
| JP | 2002-303190 | 10/2002 |
| JP | 2003-027996 | 1/2003 |

OTHER PUBLICATIONS

International Search Report No. PCT/JP2005/010727, dated Sep. 22, 2005, 4 pgs.

* cited by examiner

*Primary Examiner*—Thomas E Denion
*Assistant Examiner*—Jonathan Matthias
(74) *Attorney, Agent, or Firm*—Connolly Bove Lodge & Hutz LLP

(57) ABSTRACT

In an exhaust gas after-treatment apparatus (30) including a particulate filter (32) that receives an exhaust gas having passes through a catalyst converter (31) and traps particulates in an exhaust, injectors (6 through 9) used for a post fuel injection to activate the catalyst converter (31), and a filter control unit (36) that performs post fuel injection control, the filter control unit (36) includes a determination portion that determines whether a post fuel injection operation should be started, and a calculation portion that calculates an integration value of a fuel injection amount after the post fuel injection operation is started in a case where the post fuel injection operation is started in responding to the determination portion. The post fuel injection operation is stopped when the integration value has reached a specified value. It is thus possible to appropriately perform the post fuel injection control to activate the catalyst converter.

4 Claims, 4 Drawing Sheets

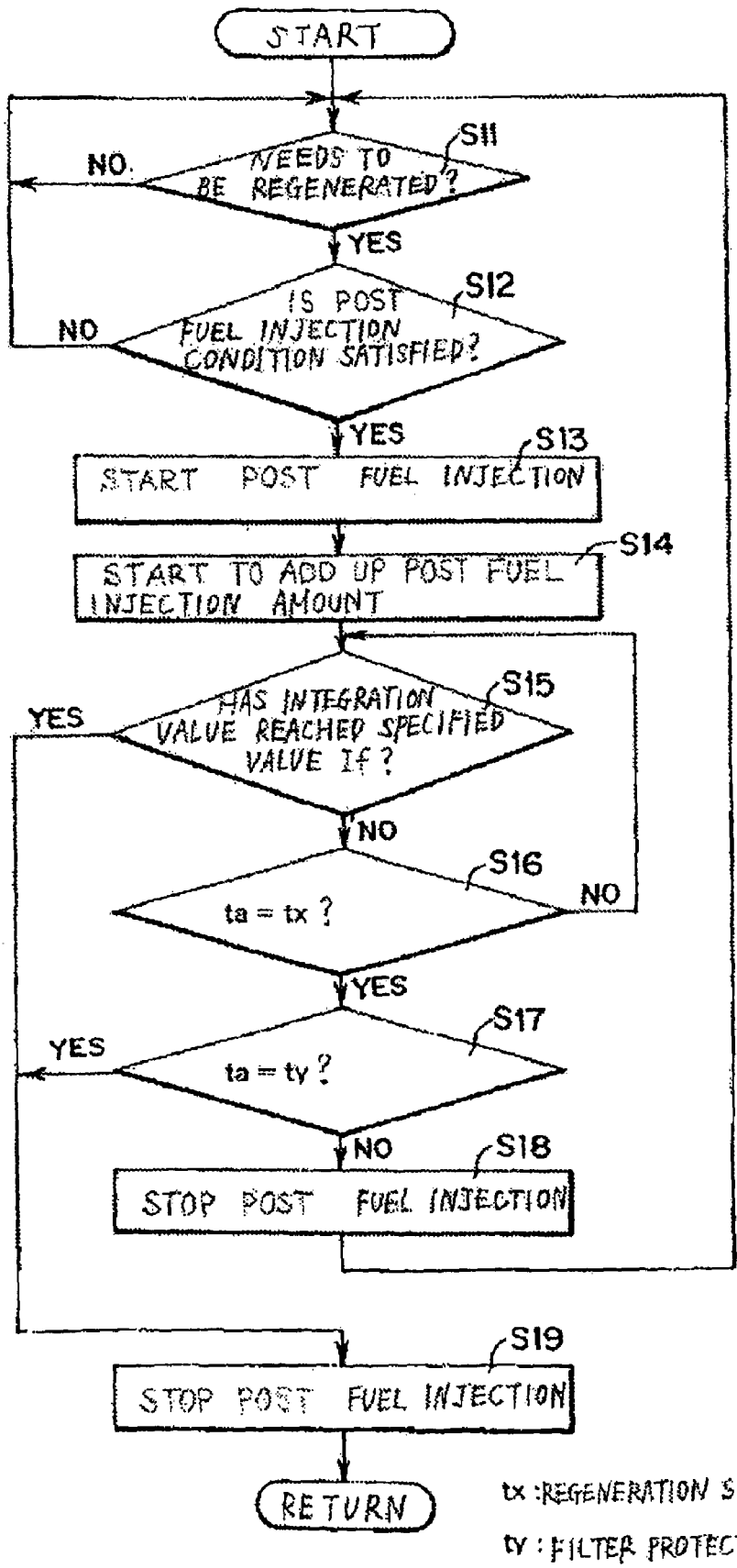

EXHAUST GAS AFTER-TREATMENT APPARATUS

CROSS REFERENCE

This application is a National Phase patent application of PCT/JP2005/010727, filed Jun. 6, 2005, which claims priority to JP 2004-169645, filed Jun. 8, 2004.

TECHNICAL FIELD

The present invention relates to an exhaust gas after-treatment apparatus to purify an exhaust gas from the internal combustion.

BACKGROUND ART

For the purpose of removing particulates, such as NOx and particulate matter, generated in an exhaust gas with the driving of the internal combustion, in particular, the diesel internal combustion, there has been known an exhaust gas after-treatment apparatus in which a catalyst converter that oxidizes and burns carbon hydride in an exhaust gas is combined with a particulate filter that traps particulates, so that combustion of the particulates trapped in the particulate filter is promoted with the use of heat generation in the catalyst converter (JP-A-8-42326).

Incidentally, the catalyst converter of this type fails to exert the desired effect unless it is activated by being heated to a certain temperature. Hence, as is disclosed in JP-A-8-296485, there is known a method by which whether the catalyst is in an activated state is determined, for example, by detecting the temperature of the catalyst, and when the catalyst is determined to be in an inactivated state, an additional fuel injection, a so-called secondary fuel injection, is performed into the cylinder at specific timing later than the original combustion injection timing for the catalyst to become activated.

The control of the post fuel injection in the related art, however, is to promote the activation of the catalyst when the catalyst is determined to be in an inactivated state by injecting fuel into the cylinder intermittently at specific timing after the retain injection in an amount meeting with the driving condition of the engine, the external environmental condition, and so forth at that point in time.

No problem occurs in a case where the driving condition of the engine, the external environmental condition, and so forth remain the same to some extent. However, under the driving environment where these conditions vary in a relatively drastic manner, the activation of the catalyst is not promoted as expected even by the post fuel injection, and fuel is consumed wastefully after all. This method therefore has a problem that it becomes a large cause of deterioration in fuel consumption and it rather increases environmental pollution by emitting a large amount of unburned fuel together with the exhaust gas.

An object of the invention is therefore to provide an improved exhaust gas after-treatment apparatus capable of solving the problems in the related art discussed above.

Another object of the invention is to provide an improved exhaust gas after-treatment apparatus capable of achieving appropriate post fuel injection control.

DISCLOSURE OF THE INVENTION

The invention is characterized in that, in an exhaust gas after-treatment apparatus furnished with a catalyst converter that oxidizes and burns carbon hydride contained in an exhaust gas from art internal combustion, a particulate filter that receives the exhaust gas having passed through the catalyst converter and traps particulates in an exhaust, a fuel injection member used to inject and supply fuel to activate the catalyst converter, and a control portion that controls a fuel injection operation of the fuel injection member, the control portion includes: a determination portion that determines whether a fuel injection operation to activate the catalyst converter should be started; a calculation portion that calculates an integration value of a fuel injection amount after the fuel injection operation is started in a case where the fuel injection operation is started in responding to the determination portion; and an injection operation stopping portion that stops the fuel injection operation in responding to the calculation portion when the integration value has reached a specified value.

According to the invention, in an exhaust gas after-treatment apparatus configured to raise the temperature of an exhaust gas supplied to the particulate filter with the use of the catalyst converter, it is possible to appropriately control the fuel injection operation to activate the catalyst.

BRIEF DESCRIPTION OF THE DRAWINGS

FIG. 3 is a flowchart detailing a filter control program executed in a filter control unit.

BEST MODE FOR CARRYING OUT THE INVENTION

In order to describe the invention more in detail, descriptions will be given with reference to the accompanying drawings.

Figure 1:
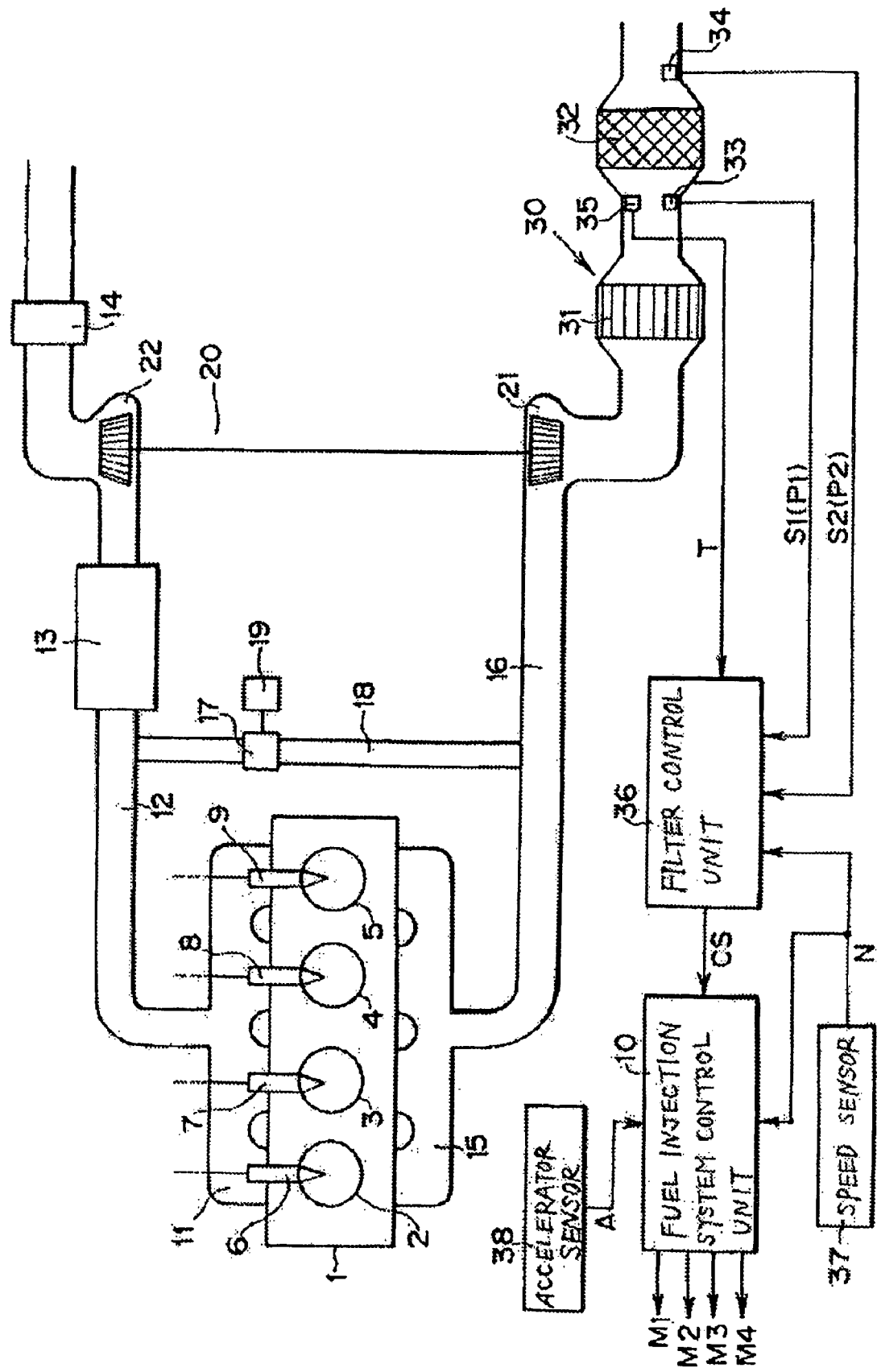
FIG. 1 is a view showing the overall configuration of one embodiment when the invention is applied to an exhaust gas after-treatment apparatus for a diesel engine.

FIG. 1 is a view showing the overall configuration of one embodiment when the invention is applied to an exhaust gas after-treatment apparatus for a diesel engine. Numeral 1 denotes a four-cylinder diesel engine, and injectors 6 through 9 serving as fuel injection members are provided to cylinders 2 through 5, respectively. Operations of these injectors 6 through 9 are controlled by a fuel injection, system control unit 10, and as will be described below, it is of a known configuration to enable high-pressure fuel to foe injected and supplied to the corresponding cylinders in a necessary amount at necessary timing.

An intercooler 13 and an air cleaner 14 are provided to an intake duct 12 connected to an intake manifold 11, whereas an exhaust duct 16 is connected to an exhaust manifold 15.

An exhaust recirculation channel 18 having an EGR control valve 17 is provided between the intake duct 12 and the exhaust duct 16, and the opening of the EGR control, valve 17 is adjusted by an actuator 19 controlled by the fuel injection system control unit 10. It is thus configured in such a manner that part of an exhaust gas flowing through the exhaust duct 16 is returned to the intake manifold 11 while an amount thereof is being adjusted. Numeral 20 denotes an exhaust turbocharger, and it comprises an exhaust turbine 21 disposed inside the exhaust duct 18 and a compressor 22 disposed inside the intake duct 12 and driven by the exhaust turbine 21.

The exhaust gas after-treatment apparatus denoted by Numeral 30 as a whole includes a catalyst converter 31 that oxidizes and burns carbon hydride contained in an exhaust gas from the internal combustion, and a particulate filter 32 that receives the exhaust gas having passed through the catalyst converter 31 and traps particulates in an exhaust. It is therefore configured in such a manner that an exhaust gas flowing through the exhaust duct 16 first flows to the catalyst converter 31 and then flows to the particulate filter 32. The catalyst converter 31 has a configuration in which activated alumina or the like is coated on the surface of a honeycomb-shaped carrier made of, for example, cordierite or heat-resisting steel, to form a wash coat layer, and catalyst active ingredients made of noble metal, such as platinum, palladium, and rhodium, is deposited on this coat layer. The catalyst converter is configured not only to generate $NO_2$ by oxidising $NO$ in an exhaust gas, but also to generate $H_2O$ and $CO_2$ by oxidizing HC and CO in an exhaust gas.

The particulate filter 32 uses, for example, a honeycomb filter of a so-called wall flow type in which a large number of cells are formed in parallel from porous cordierite or silicon carbide with the inlets and the outlets of the cells being closed alternately, or a fiber filter formed by winding ceramic fibers around a stainless porous tube in many layers, and it traps particulates in an exhaust gas.

A first pressure sensor 33 and a second pressure sensor 34 that detect a pressure of an exhaust gas are provided respectively on the inlet side (front) and on the outlet side (rear) of the particulate filter 32. A first pressure signal S1 indicating an exhaust gas pressure P1 on the inlet side of the particulate filter 32 is outputted from the first pressure sensor 33, and a second pressure signal S2 indicating an exhaust gas pressure P2 on the outlet side of the particulate filter 32 is outputted from the second pressure sensor 34. Numeral 35 denotes a temperature sensor that detects the temperature of an exhaust gas on the inlet side (front) of the particulate filter 32. An exhaust temperature signal T from the temperature sensor 35 is inputted into a filter control unit 36 together with the first pressure signal S1 and the second pressure signal S2. An engine speed signal N indicating the rotational frequency of the diesel engine 1 is also inputted into the filter control unit 36 from a speed sensor 37.

The filter control unit 36 outputs a control signal CS to control a fuel injection (herein, occasionally referred to as a post fuel injection) from the injectors 6 through 9 to activate the catalyst converter 31 when the need arises. The control signal CS is sent to the fuel injection system control unit 10.

Besides the control signal CS, the engine speed signal N and an accelerator signal A from an accelerator sensor 38 that detects an operation amount on the acceleration pedal (not shown) are inputted into the fuel injection system control unit 10, and driving signals M1 through M4 to drive the injectors 6 through 9 are outputted in response to these signals. The injectors 6 through 9 are independently controlled to open, and close by the corresponding driving signals M1 through M4, and high-pressure fuel inside the common rail of an unillustrated common rail type fuel injection system is injected and supplied to the respective cylinders.

Figure 2:
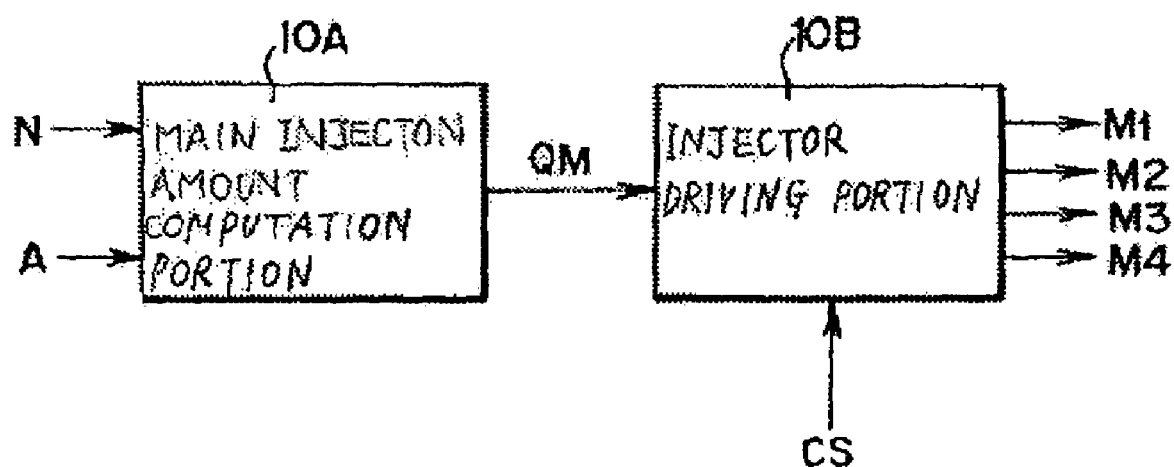
FIG. 2 is a detailed block, diagram of a fuel injection system control unit.

FIG. 2 is a detailed, block diagram of the fuel injection, system control unit 10. The fuel, injection system control unit 10 has a main injection amount computation portion 10A that computes a main fuel injection amount to be injected into the respective cylinders 2 through 5 of the diesel engine 1 in response to the accelerator signal A and the engine speed signal N. A main injection amount signal QM outputted from the main, injection amount computation portion 10A is inputted info an injector driving portion 10B into which the control, signal CS is inputted.

The injector driving portion 10B performs main injection control to allow the injectors 6 through 9 to inject, a main, fuel injection amount determined, by the main injection amount signal QM into the corresponding cylinders at necessary main fuel injection timing in response to the main injection amount signal QM. The injector driving portion 10B further performs secondary injection control to allow the injectors 6 through 9 to inject fuel in a post fuel injection amount determined by the control signal CS into the corresponding cylinders at specific timing later than the main fuel injection timing in response to the control signal CS.

The filter control unit 36 will now be described with reference to FIG. 3.

The filter control unit 36 is formed using a micro computer, and a specific filter control program is executed herein. The filter control unit 36 is configured, to perform control by executing this filter control program, in such a manner that it determines whether a fuel injection operation (post fuel injection operation) to activate the catalyst converter 31 should be started, and it calculates an integration value of a fuel injection amount after the post fuel injection operation is started in a case where the post fuel injection, operation is started in response to the determination result and stops the post fuel injection operation when the integration value has reached a specified value.

FIG. 3 is a flowchart detailing the filter control program described above. When the filter control program is started by switching the key switch ON from OFF, whether the particulate filter 32 seeds to be regenerated is determined first in Step S11. Herein, the program is configured in such a manner that, whether a front-rear pressure difference ΔP of the particulate filter 32 has exceeded a specified level is determined on the basis of the first pressure signal S1 and the second pressure signal. S2, and when the front-rear pressure difference ΔP has exceeded the specified level, the particulate filter 32 is determined that it needs to be regenerated on the assumption that an amount of particulates trapped in the particulate filter 32 has exceeded a specified amount, according to which the determination result in Step S11 is found to be YES. When the front-rear pressure difference ΔP has not exceeded, the specified level, the determination result in Step S11 is NO, and Step S11 is performed repetitively until the front-rear pressure difference ΔP exceeds the specified level Besides the determination based on the front-rear pressure difference ΔP, the determination of the necessity of regeneration in Step S11 may be made according to an appropriate computation to estimate an amount of deposited particulates.

When the determination result in step S11 is YES, the flow proceeds to Step S12, in which whether the post fuel injection condition is satisfied is determined. In this embodiment, whether the temperature of the particulate filter 32 on the inlet side of an exhaust gas falls within a specific range where activation of the catalyst converter 31 by the post fuel injection is promising is determined on the basis of the exhaust temperature signal T. When the temperature of the particulate filter 32 on the inlet side of an exhaust gas fails within the specific range, the judgment result in Step S12 is YES, and the flow proceeds to Step S13. On the other hand, when the temperature of the particulate filter 32 on the inlet side of an exhaust gas fails outside the specific range, activation of the catalyst converter 31 is not expected even by the post fuel injection. The determination result in Step S12 is therefore NO, and the flow returns to Step S11.

In other words, Step S13 and the following steps are performed in a case where an amount of deposited particulates in the particulate filter 32 is equal to or higher than the specified level and activation by the post fuel injection is expected under the movement condition of the catalyst converter 31.

In Step S13, a target value of the post fuel injection amount is computed on the basis of the exhaust temperature signal T, and start processing of the post fuel injection is executed, by which not only this target value is notified, but also the control, signal CS providing an instruction to start the post fuel injection is sent to the fuel inject ion system control unit 10, after which the flow proceeds to Step S14.

In Step S14, a computation to add up the post fuel injection amount instructed in Step S13 is started, and the latest value of the integration value is stored in the memory (not shown) of the micro computer.

In subsequent Step S15, whether the integration value computed in Step S14 has reached a specified value If is determined. When the computed integration value has not reached the specified value If, the determination result in Step S15 is NO, and the flow proceeds to Step S16. In Step S16, it is determined whether the temperature ta of the particulate filter 32 on the inlet side has reached a regeneration sustainable temperature tx needed to sustain the regeneration of the particulate filter 32.

When the temperature ta on the inlet side has not reached the regeneration sustainable temperature tx, the determination result in Step S16 is NO, and the flow returns to Step S15. On the other hand, when the temperature ta on the inlet side has reached the regeneration sustainable temperature tx, the determination result in Step S16 is YES, and the flow proceeds to Step S17. In Step S17, it is determined whether the temperature ta on the inlet side has reached a filter protectable temperature ty, which is the upper limit value of the temperature up to which, the particulate filter 32 is not damaged. When the temperature ta on the inlet side has not reached the filter protectable temperature ty, the determination result in Step S17 is NO, and the flow proceeds to Step S18. In Step S18, the post fuel Injection is determined; to be stopped, and the control signal CS providing an instruct ion to stop the post fuel injection is outputted. The flow then returns to Step S11.

When the temperature ta on the inlet side is determined to have reached the filter protectable temperature ty in Step S17, the determination result in Step S17 is YES, and the flow proceeds to Step S19, in step S19, the post fuel injection is determined to toe stopped, and return, processing to end the execution of this filter control program is started. When, the integration value is determined to have reached the specified value If in Step S15, the determination result in Step S15 is YES, and the flow proceeds to Step S19 to stop the post fuel injection and perform the return processing.

As has been described, when the integration value is determined to have reached the specified value If, the post fuel injection is stopped, regardless of the temperature condition of the particulate filter 32 on the inlet side. The reason why the post fuel injection is terminated is because when the integration value is determined to have reached the specified value, the activation in the catalyst converter 31 is not taking place as expected, and there is a high possibility that fuel is consumed wastefully.

Figure 4A:
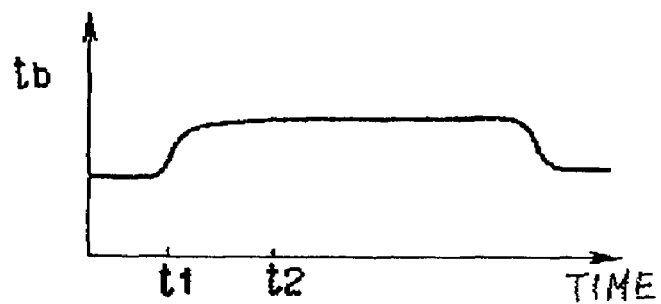
FIG. 4A is a view used to describe movements of the exhaust gas after-treatment apparatus.
Figure 4B:
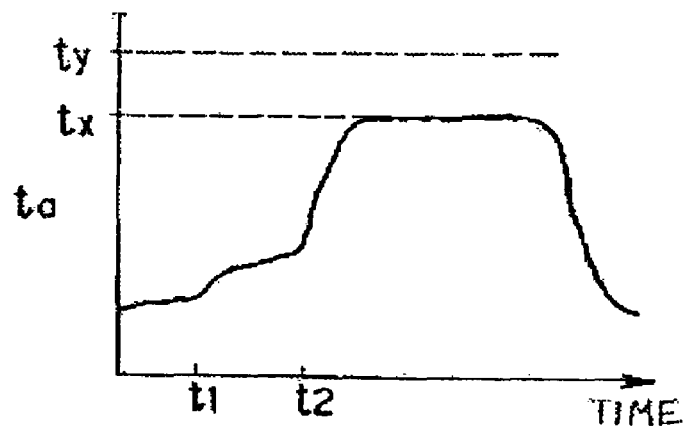
FIG. 4B is a view used to describe Movements of the exhaust gas after-treatment apparatus.
Figure 4C:
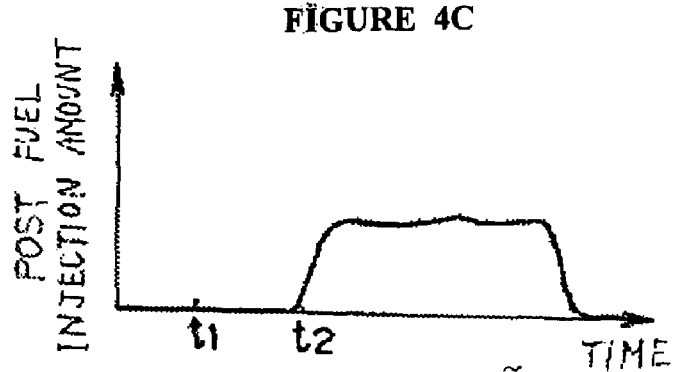
FIG. 4C is a view used to describe movements of the exhaust gam after-treatment apparatus.
Figure 4D:
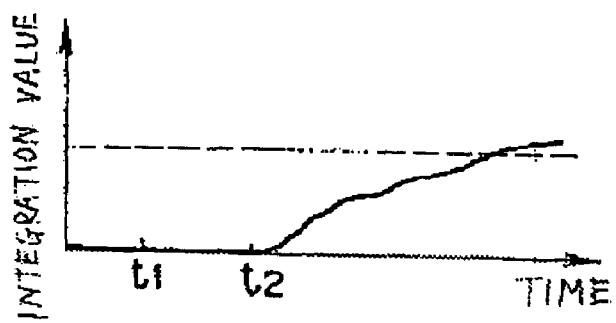
FIG. 4D is a view used to describe movements of the exhaust gas after-treatment apparatus.

The foregoing will foe described with reference to FIG. 4A through FIG. 4D. FIG. 4A through FIG. 4D are views used to describe movements of the exhaust gas after-treatment apparatus 30, and the abscissa is used for time in all the drawings. FIG. 4A is a view showing a temporal change of a temperature tb of the catalyst converter 31 on the inlet side. FIG. 4B is a view showing a temporal change of the temperature ta of the particulate filter 32 on the inlet side. FIG. 4C is a view showing a temporal change of the post fuel injection amount. FIG. 4D is a view showing a temporal change of the integration value of the post fuel injection amount shown in FIG. 4C.

As can be understood from FIG. 4A through FIG. 4D, the diesel engine 1 starts driving at a time t1, and as the temperature tb rises accordingly, the temperature ta starts to rise with a delay in time.

When the temperature ta exceeds the specified value at a time t2, the determination, result in Step S12 is YES, and the post fuel injection is started. The catalyst converter 31 is thus activated, and the temperature ta rises abruptly.

As can foe understood from a comparison between FIG. 4B and FIG. 4D, when the integration value has reached a certain level, the catalyst converter 31 is sufficiently activated and a rising of the temperature ta saturates. In FIG. 4B, the temperature ta on the inlet side reaches the regeneration sustainable temperature tx in this saturation state. Herein, ty is the filter protectable temperature.

As has been described, in a case where the driving environment of the diesel engine 1 will net change drastically, a certain correlation is established between the integration value of the post fuel, inject ion and the temperature ta. Hence, in such a case, the post fuel injection can be terminated when the temperature ta has reached the specified value. However, in a case where the driving environment of the diesel engine 1 changes drastically, activation of the catalyst converter 31 is not promoted satisfactorily as expected by the post fuel injection. Hence, in such a case, monitoring the temperature ta alone is insufficient, and the integration value of the post fuel injection, amount is also monitored at the same time, so that when the integration value of the post fuel injection amount has reached the specified value If, the post fuel injection is terminated regardless of the value of the temperature ta. The post fuel injection exerting a small effect of activating the catalyst converter 31 is thus terminated forcedly. Even when the integration value is determined not to have reached the specified value If in Step S15, the post fuel, injection is stopped in a case where the temperature, ta on the inlet side has reached the regeneration sustainable temperature tx and has not reached the filter protectable temperature ty.

Because the exhaust gas after-treatment apparatus 30 is configured in the manner as described above, the integration value of the post foal injection is monitored, and the post feel injection is terminated forcedly when an amount of fuel expected to be necessary to active the catalyst converter 31 has been consumed. It is thus possible to effectively prevent fuel from being consumed wastefully, which can in turn suppress deterioration of fuel effectively. In addition, because an emission into air of fuel that fails to make a significant contribution to the promotion of the catalyst converter 31 can be effectively suppressed, an effect of preventing environmental pollution is also provided. Further, because the post fuel injection is not perforated excessively, it is possible to make a contribution to an improvement of the problem of oil dilution.

INDUSTRIAL APPLICABILITY

According to the invention, it is possible to appropriately control the fuel injection operation to activate the catalyst, which is useful in improving an exhaust gas after-treatment apparatus.

The invention claimed is:

1. An exhaust gas after-treatment apparatus comprising a catalyst converter that oxidizes and burns carbon hydride contained in an exhaust gas from an internal combustion engine, a particulate filter that receives the exhaust gas passing through the catalyst converter and traps particulates in an exhaust, a fuel injection member used to inject and supply fuel to activate the catalyst converter, and a control portion that controls a fuel injection operation of the fuel injection member, characterized in that the control portion includes:
   a first determination portion for determining whether the particulate filter needs to be regenerated;
   a second determination portion that determines whether a fuel injection operation to activate the catalyst converter should be started in response to the first determination portion when the temperature of the particulate filter on the inlet side of an exhaust gas falls within a specific range;
   a calculation portion that calculates an integration value of a fuel injection amount after the fuel injection operation is started in a case where the fuel injection operation is started in response to the second determination portion;
   a third determination portion that determines whether the integration value has reached a specified value;
   a fourth determination portion that determines whether said temperature has reached a regeneration sustainable temperature needed to sustain a regeneration of the particulate filter;
   a fifth determination portion that determines whether said temperature has reached a filter protectable temperature, which is the upper limit value of the temperature up to which the particulate filter is not damaged; and
   an injection operation stopping portion that stops the fuel injection operation in response to the third to fifth determination portions when the integration value has reached a specified value or when said temperature has reached said regeneration sustainable temperature or said filter protectable temperature.

2. The exhaust gas after-treatment apparatus according to claim 1, wherein
   the second determination portion further includes means for determining whether a post fuel injection condition is satisfied.

3. The exhaust gas after-treatment apparatus according to claim 1, wherein:
   whether the particulate filter needs to be regenerated is determined according to a front-rear pressure difference of the particulate filter.

4. The exhaust gas after-treatment apparatus according to claim 2, wherein:
   whether the post fuel injection condition is satisfied is determined according to an exhaust temperature.

* * * * *